Patented May 4, 1954

2,677,621

UNITED STATES PATENT OFFICE 2,677,621

WHITE LEAD-CONTAINING PIGMENT AND METHOD OF MAKING

William J. Clapson, Joplin, and Earl W. Amthauer, Carl Junction, Mo., assignors to The Eagle-Picher Company, Cincinnati, Ohio, a corporation of Ohio No Drawing. Application May 16, 1950, Serial No. 162,394

13 Claims. (Cl. 106—297)

This invention relates to pigments and their preparation. It is directed particularly to improved white, opaque, lead-containing pigments adapted for use in paints and other compositions, and to methods of making such pigments. The pigments of the invention are characterized by low lead content in conjunction with excellent color, durability and hiding power or opacity.

The lead pigments of white color which are in widest use today are basic carbonate white lead and basic sulfate white lead. Both of these compositions are used extensively in the formulation of paints for interior and exterior surfaces in admixture with drying oil vehicles, upon which the pigments confer durability and resistance to wear or weathering in conjunction with the white color they impart. Pigments from other metals such as zinc, barium, and titanium also find use in the paint industry because of special properties which they possess, but such other pigments are either more expensive or less desirable in other respects, and for these reasons, the specific lead pigments have been favored in industry for many years. Originally, the term "white lead" was applied only to basic lead carbonate, but in recent years it has been the tendency to also refer to the basic lead sulfate as "white lead." Throughout the remainder of this specification when comparisons are made, the term "white lead" is intended to refer either to the basic carbonate or sulfate unless otherwise specifically identified.

In a typical white lead pigment, the actual lead content, calculated as metallic lead, constitutes a substantial percentage of the total pigment weight; for instance, basic carbonate white lead contains about 80% lead, computed as metallic Pb. With the marked reduction that has occurred in recent years in the availability of lead, various efforts have been made to provide pigments of quality equal to or approaching that of white lead but containing less Pb. While lead pigments containing less lead than white lead have been produced, they have displayed inferior properties in one or another of the qualities by which a pigment is judged and selected, such as its opacity, hiding or covering power, its durability when incorporated in a vehicle, and its permanence of color. For instance, pigments of lesser cost have been dry blended with standard white lead pigment in efforts to produce a blended compound containing less lead than the white lead component, but it frequently occurs that the incorporation of the inferior pigment with the white lead so affects the total properties of the resulting blend that the actual value of the high quality pigment is virtually wasted. Other efforts have been made recently to provide a thin coating of a high grade lead pigment compound on the surfaces of particles of an inexpensive substance such as silica, upon the theory that it is only the surface of a pigment particle which controls the pigment qualities of the particle, while the interior is inert and unimportant. However, such products are invariably gritty, and paints made from them are difficult to apply by brush.

The principal objective of the present invention has been to provide a lead type pigment which displays white color, hiding power and film durability comparable to basic carbonate white lead but which contains appreciably less lead with a marked increase in bulking value, and is therefore inherently less costly to produce and use. A further objective of the invention has been to provide an active pigment adapted to be incorporated in various oil vehicles and being of a basic nature capable of chemically neutralizing the various organic acids which cause degradation of the paint film. A further objective has been to provide a basic lead-type pigment which is substantially permanent in color and does not darken or deteriorate when exposed to light or weather conditions in the presence of an oil vehicle. In addition to these objectives, the invention also is directed to a process of making a low lead opaque white pigment in a simple and convenient manner adapted to use on an industrial scale.

The pigments of this invention are of low specific gravity and are characterized by relatively low percentage of lead in chemical association with magnesium in the form of a basic lead-magnesium complex. These pigments are of whiteness comparable to basic carbonate white lead as well as basic sulfate white lead and possess comparable hiding power or opacity, and durability. The invention is predicated upon the discovery and determination that a precipitate produced by reaction of lead monoxide and magnesium carbonate from an aqueous slurry possesses these characteristics.

A dry blend of magnesium carbonate and white lead is of pigmentary nature, and of course contains less lead than white lead, in direct proportion to the amount of magnesium carbonate in the blend. However, inasmuch as the refractive indices of magnesium carbonate and oil are similar, the hiding power of a mixture of the two is poor, and therefore, a dry blend pigment containing magnesium carbonate is devalued by its presence. However, we have determined that the mixing of lead monoxide and magnesium carbonate in the presence of water, in which these components are in slurry suspension, is accompanied by a chemical reaction between these components resulting in the formation of a precipitate either consisting of or containing a lead-magnesium complex, and that such precipitate when filtered and dried has very desirable pigment properties but contains a proportion of lead which is appreciably less than the proportion of lead in either basic sulfate or carbonate white lead. Thus, to illustrate one typical method by which the invention may be practiced, a slurry of lead oxide and a slurry of magnesium carbonate are admixed with one another at room temperature or higher and the components commence to react. Initially, the presence of the litharge confers a yellow cast upon the admixture but as precipitation continues, the color becomes lighter and lighter and, upon completion of reaction, only a white precipitate of good color exists. This precipitate is then recovered by filtration and is dried to form a soft, fluffy pigment consisting of fine particles. The precipitate may contain lumps, but these are easily disintegrated, for instance, by treatment in a pulverizer, but the pigment need not be ground.

The addition of magnesium carbonate to a slurry of PbO would logically be expected to result in the formation of magnesium oxide and lead carbonate according to the equation $$PbO + MgCO_3 = MgO + PbCO_3$$

On the other hand, if the presence of the water is taken into account, reaction would logically be expected to proceed as follows:

$$MgCO_3 + PbO + H_2O = Mg(OH)_2 + PbCO_3.$$

In either case, the end products do not possess pigmentary properties. Actually, however, physical testing and chemical analysis indicate the reaction does not proceed between the litharge and the magnesium carbonate according to the equations just indicated, but results in the formation of a precipitate containing a lead-magnesium salt. The precipitate in any event is of high quality as a pigment when it is dry.

From the evidence available at the present time, it is difficult to conclude with certainty just how the reaction does proceed. Magnesium carbonate is available in the form of salts of various chemical composition and hydration, all known by the generic name, and one may express the reaction in different ways depending upon the magnesium salt selected for incorporation, as well as upon the molecular proportions of lead oxide and magnesium carbonate in the reaction. A typical practice of this invention is with a commercial precipitated magnesium carbonate of the empirical formula $11MgCO_3 \cdot 3Mg(OH)_2 \cdot 11H_2O$. Thus, the following equations are typical of possible reactions:

(1) $11MgCO_3 \cdot 3Mg(OH)_2 \cdot 11H_2O + 15.0PbO + 7H_2O = 3PbCO_3 \cdot Mg(OH)_2 \cdot 3H_2O + 4[2PbCO_3 \cdot Pb(OH)_2] + 13Mg(OH)_2$ (2) $11MgCO_3 \cdot 3Mg(OH)_2 \cdot 11H_2O + 16PbO + 6H_2O = \frac{1}{3}[3PbCO_3 \cdot Mg(OH)_2 \cdot 3H_2O] + 5[2PbCO_3 \cdot Pb(OH)_2] + 13.67Mg(OH)_2$ (3) $11MgCO_3 \cdot 3Mg(OH)_2 \cdot 11H_2O + 15.5PbO + 6.5H_2O = \frac{2}{3}[3PbCO_3 \cdot Mg(OH)_2 \cdot 3H_2O] + 4.5[2PbCO_3 \cdot Pb(OH)_2] + 13\frac{1}{3}[Mg(OH)_2]$ (4) $11MgCO_3 \cdot 3Mg(OH)_2 \cdot 11H_2O + 15.55PbO + 5.55H_2O = \frac{1}{3}[3PbCO_3 \cdot Mg(OH)_2 \cdot 3H_2O] + 4.85[2PbCO_3 \cdot Pb(OH)_2] + 13.37Mg(OH)_2 + 0.3MgCO_3$ According to these equations, the reaction yields a complex lead-magnesium carbonate, in conjunction with basic carbonate white lead and magnesium hydroxide, the latter of which, it will be noted, is always present in substantial quantity. Magnesium hydroxide has no significant pigment properties and, though it is of white color, its opacity in oil is poor and its water solubility, though limited, impairs its durability under weathering conditions. It is completely unexpected, therefore, that the conjoint precipitate in which this material is present in significant proportion should be found to have an opacity equalling that of white lead and have favorable weather resistance or durability. Assuming these equations are valid, it is to be observed that a substantial portion of the magnesium originally present appears as hydroxide, and the lead originally present appears either in chemical combination with the magnesium or in a white lead component.

Most significantly, the total lead content of the dried pigment resulting from the reaction is appreciably less than the lead content of basic carbonate or sulfate white lead. This actual lead content of the new pigment may be varied according to the portions of litharge and magnesium compound selected for reaction. Thus, pigments containing from approximately 20% to 70% and more by weight of lead have been produced, all of which display desirable pigment properties. Reaction, within substantially these limits, appears to go to completion but the course of the reaction no doubt is governed by the ratio between the components. Within this range of 20% to 70% Pb, our pigments exhibit greater hiding power the higher the lead content, although this is not in direct proportion. In fact, there is very little change in hiding power between lead magnesium carbonate pigments having 40% PbO by weight and those having 60% PbO by weight. The increased fluffiness of such pigments and the resulting higher bulking value of compositions with lower lead content may thus preferably be utilized without an undue sacrifice in hiding power. Bulking value is conveniently measured in pounds per solid gallon or as the reciprocal of the density of the solid pigment. A high bulking value is extremely desirable in the compounding of paints either of the single pigment variety or in combination with other standard pigments.

Analysis of the pigments by X-ray diffraction indicates that lead oxide is absent, but it is to be distinctly understood that the invention is not limited to reactions proceeding according to the equations or theories that have been advanced for, indeed, the process, conducted as disclosed herein, yields the desirable pigments regardless of the chemical mechanism by which they may actually have been formed.

It is obvious from the equations given above that our pigment will have the acid-accepting properties of white lead, in addition to those of the $Mg(OH)_2$ which is present. This reactivity is exhibited particularly, and desirably, in the ability of this pigment to accept the decomposition products of oils employed in the various vehicles which may be used in the preparation of paints.

Additionally, paints constituted from our pigments display a buttery consistency which is so desirable in applying surface coatings. When contrasted with white lead paints, paints from our pigments, in part because of their higher bulking value, exhibit these buttery qualities at lower pigment-to-vehicle-ratios than is obtainable with white lead paints.

In the characteristic practice of this invention, we have found that the presence of a small amount of acetic acid, nitric acid or the like exerts a catalytic effect on the reaction, functioning, probably, to increase the solubility of the lead and magnesium components of reaction. Two examples carried out under identical conditions except for the presence of acetic acid catalyst will demonstrate the general effect of this catalyst. In each of these cases 50 grams of litharage and 50 grams of basic magnesium carbonate were placed in a 14 oz. glass jar, in the first case along with 300 grams of water, and in the second case with 300 grams of 0.2% acetic acid. Four small porcelain balls were put in each of the jars, and the jars were rolled on a roller table until the reaction between the litharge and the basic magnesium carbonate was completed, as indicated by no further change of color of the contents. At the end of two days a sample of the precipitate was filtered and dried, and its reflectivity in a suitable vehicle under controlled conditions was determined. The reaction occurring in the absence of acetic acid exhibited a much slower rate of change and the rolling was continued for eight days before the color of the precipitate equalled that of the acetic acid solution precipitate withdrawn after only two days.

In addition to the just described method of ball milling the reactants in an aqueous medium, it has been found that comparable results can be obtained in an open container at similar temperatures by preparing a slurry of litharge and adding to it, in the presence of a small quantity of acetic acid, basic magnesium carbonate in a slurry or as a dry composition. The litharge slurry to which basic magnesium carbonate is added is agitated by a mechanical mixer during and between additions. It has also been found that this addition of basic magnesium carbonate to a litharge slurry is slightly superior to carrying out the reaction by the converse process, addition of a litharge slurry to a basic magnesium carbonate slurry under otherwise identical conditions.

We have determined that the slurry reaction between magnesium carbonate and litharge is accelerated by higher temperatures. Such use of higher temperatures not only increases the rate of reaction but also helps the reaction go to completion, since at these temperatures any tendency of the reaction to become blocked is eliminated or inhibited. Specifically, we have found that at 170° F., the reaction goes to substantial completion in about one hour. Further, we have found that these temperatures actually produce a product superior to any of those obtained by ball milling at room temperature or open container slurry agitation at such a temperature.

We can use, as the source of $MgCO_3$, either the mineral magnesium carbonate compounds, such as magnesite, $MgCO_3$, or the prepared precipitated magnesium compounds which vary according to hydration and $Mg(OH)_2$ content. In addition, we can provide a magnesium carbonate by precipitation of $MgCO_3$ from $Mg(OH)_2$ with $CO_2$ either prior to the reaction with lead or in the presence of the lead compound. The preferred lead component is chemical grade litharge, preferably of the yellow variety.

EXAMPLE I

*Composition of reacting mixtures*

| Mixture No. | Litharge (g.) | Magnesium Carbonate (g.) | Dilute Acetic Acid (0.2% $HC_2H_3O_2$) |
|---|---|---|---|
| 1 | 10 | 90 | 350 |
| 2 | 20 | 80 | 350 |
| 3 | 30 | 70 | 350 |
| 4 | 40 | 60 | 350 |
| 5 | 50 | 50 | 350 |
| 6 | 60 | 40 | 350 |
| 7 | 70 | 30 | 350 |

In this example, seven samples of our pigment were prepared with the proportion of litharge in the dry starting material, ranging from 10% to 70%. A basic magnesium carbonate, which was 70% $MgCO_3$ by weight, was employed as the source of the magnesium component. A dilute solution of acetic acid was prepared by diluting 10 grams of acetic acid to 5000 ml. with water. Each of the seven litharge and magnesium carbonate samples was weighed out and each set, or pair, was mixed with 350 ml. of the dilute acid. Each slurry was transferred to a 14 oz. glass jar. Four porcelain balls were added to each. The jars were sealed and placed on a roller table to roll until white. When first mixed, mixtures 1, 2, 3 and 4 were too thick to roll. Therefore, water was added as follows: to No. 1, 25 ml.; to No. 2, 25 ml.; to No. 3, 10 ml.; and to No. 4, 5 ml.

The reaction between the litharge and magnesium carbonate began shortly after mixing, as indicated by an increase in the consistency of the slurries. After several hours, the mixtures began to lighten noticeably in color. After twenty-four hours, mixture No. 1 was white and therefore was removed from the roller table. Mixture No. 2 thereafter became white and was removed after rolling for four days. All the remaining samples were removed after rolling eleven days, although according to the color change the reaction was probably completed long before this time. After completion of the rolling the slurries were filtered, washed by repulping with 300 ml. of water and refiltered. Each filter cake was dried at 220° F. The dried product was weighed and the per cent recovered is indicated in the following table along with the percentage composition of the pigment product, the data of which were obtained by analysis except as to $H_2O$, which was obtained by difference.

*Composition of products*

| Mixture No. | Recovery (percent) (equal to weight in grams) | Analysis | | | |
|---|---|---|---|---|---|
| | | PbO, percent | MgO, percent | $H_2O$, percent | $CO_2$, percent |
| 1 | 91 | 10.6 | 36.6 | 19.2 | 33.6 |
| 2 | 96 | 21.4 | 33.3 | 15.5 | 29.8 |
| 3 | 94 | 31.2 | 28.7 | 13.9 | 26.2 |
| 4 | 97 | 41.8 | 24.7 | 11.1 | 22.4 |
| 5 | 98 | 51.3 | 21.0 | 9.2 | 18.5 |
| 6 | 99 | 61.3 | 17.1 | 6.7 | 14.8 |
| 7 | 97 | 71.0 | 12.6 | 4.8 | 11.6 |

In each of Examples II through V, it was the object to prepare a pigment having a lead content corresponding to approximately 50% PbO, by different methods. The properties of these pigments are compared in tables following the examples.

EXAMPLE II

This example of our pigment was prepared by the reaction of basic magnesium carbonate with litharge. A slurry was constituted as follows:

Litharge _____ lbs__ 14.5
Water _____ gals__ 12.0
Acetic acid _____ ml__ 91

This slurry was heated to 160° F. While agitating, basic magnesium carbonate (14.5 lbs.) was added at the rate of 50 grams per minute until the slurry became white; then the rate was increased to 100 grams per minute, the slurry was filtered, dried and milled.

EXAMPLE III

In this example, a batch of lead-magnesium pigment was prepared by carbonating a slurry of magnesium hydroxide and litharge with $CO_2$. The slurry was constituted as follows:

Litharge _____ lbs__ 14.5
Magnesium hydroxide _____ lbs__ 8.5
Water _____ gals__ 12.0
Acetic acid _____ ml__ 90

The slurry was heated to 150° F. While agitating, $CO_2$ was bubbled in at the rate of one cubic foot per minute. Although the theoretical time for carbonation (100% $CO_2$ absorption) was forty minutes, the bubbling was continued for one and one half hours. This product was filtered, dried and milled.

EXAMPLE IV

In this example, the pigment was prepared by adding dry magnesium hydroxide, slowly to a freshly prepared slurry of basic lead carbonate. The slurry was then filtered, dried and milled. The following materials were used:

| | Lbs. |
|---|---|
| Magnesium hydroxide | 7.0 |
| Basic lead carbonate slurry (40% solids) | 24.1 |

EXAMPLE V

In this example, our pigment was prepared by adding dry basic magnesium carbonate and magnesium hydroxide to a slurry of basic lead carbonate. The materials used were:

| | Lbs. |
|---|---|
| Basic magnesium carbonate | 9.4 |
| Magnesium hydroxide | 3.5 |
| Basic lead carbonate slurry (40% solids) | 42.7 |

The slurry was then filtered, dried and milled.

Chemical and physical properties of the reaction products of Example II through V are contained in Table I. For comparison purposes, Table I also contains data on a dry blend of basic carbonate white lead and magnesium hydroxide, reported as item 6, and on a dry blend of basic carbonate white lead, basic magnesium carbonate and magnesium hydroxide, reported as item 7. The first of these dry blends is a mechanical mixture of 11.7 lbs. basic carbonate white lead and 4.3 lbs. magnesium hydroxide, similar proportions to those of Example IV. The second dry blend was prepared from 17.1 lbs. basic lead carbonate, 9.4 lbs. basic magnesium carbonate and 3.5 lbs. magnesium hydroxide, proportions similar to those employed in Example V.

Table 1

| | Method of Preparation | Analysis | | | | |
|---|---|---|---|---|---|---|
| | | PbO | MgO | $CO_2$ | $H_2O$ | Sp. Gr. |
| Ex. 2___ | React BMC with PbO__ | 49.3 | 20.3 | 19.2 | 11.2 | 3.6 |
| Ex. 3___ | React slurry PbO and $Mg(OH)_2$ with $CO_2$. | 55.4 | 28.0 | 11.7 | 4.9 | 3.8 |
| Ex. 4___ | Blend slurry BCWL and $Mg(OH)_2$. | 51.4 | 27.6 | 7.7 | 13.3 | 3.8 |
| Ex. 5___ | Blend Slurry BCWL, BMC and $Mg(OH)_2$. | 49.1 | 20.9 | 18.1 | 11.9 | 3.7 |
| Ex. 6___ | Blend dry BCWL and $Mg(OH)_2$. | 50.5 | 28.0 | 7.3 | 14.2 | 3.9 |
| Ex. 7___ | Blend dry BCWL, BMC and $Mg(OH)_2$. | 49.1 | 20.4 | 17.9 | 12.6 | 3.6 |

For hiding power and viscosity tests, samples of each of the six items listed in Table 1 were ground in alkali refined oil at 28 PVR. The viscosities of each of these paint formulations were determined on a Stormer viscosimeter and hiding power determinations were made on three Pfund cryptometers, listed as $a$, $b$ and $c$ in Table 2.

Table 2

| | Viscosity Stormer | Hiding Power (ft.²/gal.) | | | | Hiding Power ft.²/# |
|---|---|---|---|---|---|---|
| | | $a$ | $b$ | $c$ | Avg. | |
| Ex. 2____ | 1,500 g.—46 sec____ | 133 | 166 | 188 | 160 | 19.2 |
| Ex. 3____ | 1,500 g.—41 sec____ | 140 | 191 | 212 | 180 | 20.2 |
| Ex. 4____ | 1,500 g.—80 sec____ | 142 | 173 | 194 | 170 | 19.2 |
| Ex. 5____ | 1,500 g.—78 sec____ | 132 | 168 | 194 | 165 | 19.0 |
| Ex. 6____ | 1,500 g.—140 sec___ | 137 | 168 | 204 | 170 | 18.8 |
| Ex. 7____ | 1,500 g.—90 sec____ | 123 | 147 | 164 | 145 | 17.3 |

The differences in the cryptometer readings result from qualities of the instruments themselves. It will be noted that ratios between pairs of values in any given column are roughly the same as corresponding pairs in other columns. An average gives comparative hiding power figures for the respective items.

Examples 2 and 3 represent preferred methods of carrying out the reactions of this invention; they are characterized by the use of elevated temperature and an acetic acid catalyst. However, the data indicate that some reaction occurred during the wet blending of the slurries in Examples 4 and 5, but that the degree of reaction thus inferred from viscosity and hiding power measurements is less than their counterparts in Examples 2 and 3. These data are again presented in Table 3 to bring out the relationships in the respective sets of three products.

Table 3

| PbO | MgO | $CO_2$ | Type of Product | ft.²/# Hiding Power | 1,500 g. Viscosities |
|---|---|---|---|---|---|
| 49.3 | 20.3 | 19.2 | Reacted_____ | 19.2 | 46 |
| 49.1 | 20.9 | 18.1 | Slurry Blend___ | 19.0 | 78 |
| 49.1 | 20.4 | 17.9 | Dry Blend_____ | 17.3 | 90 |
| 55.4 | 28.0 | 11.7 | Reacted_____ | 20.2 | 41 |
| 51.4 | 27.6 | 7.7 | Slurry Blend___ | 19.2 | 80 |
| 50.5 | 28.0 | 7.3 | Dry Blend_____ | 18.8 | 140 |

The critical showing of these tables is that the reacted pigments show a 15% increase in hiding power as contrasted with the hiding power of a dry blended pigment of the same final composition.

Pigments of this invention possess physical properties comparable to those of commercial white lead pigments both as to color and hiding power with the concomitant advantages of a low lead content and a lower specific gravity without displaying the abrasive natural of other supposed low lead substitutes.

Thus, our pigments find particular utility in interior and exterior house paints, enamels and surface finishes intended for either decorative or protective services. Paints which include the pigments of the invention may be either single pigment paints or multiple pigment paints in which the lead magnesium carbonate is blended with other recognized pigments. Example VI is a description of single pigment paints prepared from a lead-magnesium complex of this invention in which the lead content corresponds to approximately 30% PbO, 50% PbO and 70% PbO respectively. Example VII contains data on three multiple pigment paints which are each constituted from zinc oxide, titanium dioxide, magnesium silicate and lead magnesium carbonate pigment disclosed herein. Data on a fourth multiple pigment paint, employing white lead instead of lead magnesium carbonate pigment, have been included for comparable purposes.

EXAMPLE VI

Three samples of basic lead magnesium carbonates were prepared in the manner previously discussed. A slurry containing the litharge and the water was prepared. To this was added acetic acid in the ratio of 0.2 gram per 100 grams of water. The slurry was then heated to 170° F. While agitating with a mechanical mixer, the basic magnesium carbonate was added at a moderate rate. The data for preparation are listed below.

*Preparation data*

| Sample No. | Litharge, g | Mg. Carbonate, g. | Water, ml. | Acetic Acid, ml. | Measure of Rate of Reaction * |
|---|---|---|---|---|---|
| #1 | 3,470 | 1,090 | 14,000 | 29 | 0.014 |
| #2 | 2,280 | 2,280 | 14,000 | 29 | 0.022 |
| #3 | 1,370 | 3,190 | 14,000 | 29 | 0.036 |

* This column indicates the rate, in grams per gram PbO per minute, at which the magnesium carbonate was added to the slurry. This rate was increased after the all-white stage was reached.

The slurries were then filtered and dried at 220° F. The dried filter cake was milled. The pigments were analyzed for PbO, $CO_2$, and MgO. The $H_2O$ was obtained by difference. These data are as follows:

| Sample No. | Chemical Analyses | | | |
|---|---|---|---|---|
| | PbO, percent | $CO_2$, percent | MgO, percent | $H_2O$, percent |
| #1 | 74.4 | 9.6 | 10.0 | 6.0 |
| #2 | 50.7 | 18.5 | 20.2 | 10.6 |
| #3 | 30.9 | 25.8 | 28.3 | 15.0 |

Paints were constituted employing the pigments thus prepared in which the pigment was present to the extent of 30% by volume and the vehicle solids 70% by volume. A non-volatile linseed oil vehicle was employed together with driers, lead naphthenate (24% Pb) and cobalt naphthenate (6% Co) to the extent of 0.3 gram Pb per 100 grams oil and 0.03 gram Co per 100 grams oil. The paint was ground on a roller mill and was then thinned with mineral spirits to the viscosity of about 300 Stormer units—a painting viscosity. These paints have a higher viscosity than corresponding paints from white lead pigments; that is, it requires a greater quantity of thinner to bring them to painting consistency than for white leads at the same pigment-vehicle ratio. These lead magnesium carbonate paints appear thick in the can, but brush out very well on application. In fact, they have a buttery consistency that results in their brushing very satisfactorily on wooden surfaces. Of the three lead magnesium carbonate paints prepared, the brushing qualities of each were about the same but that of the 30% PbO composition was slightly superior to the 50% PbO, and each was better than the 70% PbO. The lead magnesium carbonate paints all had superior brushing qualities contrasted with basic carbonate white leads and basic sulfate white leads prepared under similar conditions from commercial pigments.

EXAMPLE VII

In this example, four samples of a multiple pigment point containing, as one of its pigments, a lead-containing component were prepared under identical conditions. In each case the same proportions of the non-lead constitutents, zinc oxide, titanium dioxide and magnesium silicate, were employed, together with a given volume of a specific lead-containing pigment. In each instance a paint was constituted with a linseed oil vehicle of identical proportions, as indicated in the accompanying table. For the purposes of contrast, the volumes of the lead pigments used were identical; they included not only three samples of pigments of our invention but also a white lead. The four individual lead-containing pigments employed were, respectively, basic carbonate white lead, a lead-magnesium carbonate pigment made in accordance with this invention containing 76% PbO, one containing 50% PbO, and one containing 30% PbO.

*Composition of typical multiple-pigment paints*

| | I | II | III | IV |
|---|---|---|---|---|
| Pigment: | | | | |
| Basic Carbonate White Lead (lb.) | 4.87 | | | |
| Lead Magnesium Carbonate 76% PbO (lbs.) | | 3.75 | | |
| Lead Magnesium Carbonate 50% PbO (lbs.) | | | 2.60 | |
| Lead Magnesium Carbonate 30% PbO (lbs.) | | | | 2.02 |
| Zinc Oxide (lbs.) | 3.23 | 3.23 | 3.23 | 3.23 |
| Titanium Dioxide (lbs.) | 1.55 | 1.55 | 1.55 | 1.55 |
| Magnesium Silicate (lbs.) | 1.61 | 1.61 | 1.61 | 1.61 |
| Vehicle: | | | | |
| Raw Linseed Oil (lbs.) | 4.81 | 4.81 | 4.81 | 4.81 |
| Mineral Spirits (lbs.) | 0.67 | 0.67 | 0.67 | 0.67 |
| Drier (lbs.) | 0.08 | 0.08 | 0.08 | 0.08 |
| Weight per gallon | 16.82 | 15.70 | 14.55 | 13.97 |

In each of the above formulations, the volume of the lead pigment is the same. Thus, it is readily apparent that a much smaller quantity of lead-magnesium carbonate than basic carbonate white lead is required to constitute pigment mixtures of similar volumes. This demonstrates the high bulking value per unit weight of pigments of this invention.

The high bulking value thus provided is particularly advantageous in paint compounding, for it is not unusual for prepared paints to stand in storage for relatively long periods of time. Conventional white lead paints usually show an undesirable tendency to settle thereby accumulating a heavy layer at the bottom of the can which is often extremely difficult to work up. On the other hand, paints constituted from this invention, because of the high bulking value of the pigment employed, are less apt to form a stratum of thick material at the bottom of a container and, therefore, are much easier to work and to be broken up into a satisfactory dispersion than a typical white lead paint under similar conditions.

Pigments of this invention exhibit higher oil absorption than conventional white lead pigments. We have found, therefore, that we can charge more vehicle into paints constituted from our pigments and still retain the paint's buttery consistency which gives good brushing properties. Similarly, our pigments demonstrate a lower oil absorption than dry blend or mixtures of lead and magnesium components of proportions identical to those employed to react to form our complex pigment, thus confirming that there is a chemical interaction between such starting materials when the conditions specified herein are employed.

Having described our invention, we claim:

1. A pigment consisting essentially of lead and magnesium compounds in chemical association resulting from reaction of lead oxide and magnesium carbonate in the presence of water, the said pigment having a lead content of from approximately 20 to 70% by weight and being characterized by whiteness comparable to the whiteness of basic carbonate white lead, and a higher bulking value than basic carbonate white lead.

2. A paint pigment consisting essentially of lead-magnesium carbonate complex containing from approximately 20% to 70% by weight of lead, the said pigment being a precipitate resulting from the reaction of litharge and magnesium carbonate in water.

3. A pigment consisting essentially of a dried precipitate resulting from the reaction, in the presence of water, of litharge and basic magnesium carbonate, the said pigment containing from approximately 20 to 70% by weight of lead.

4. A white pigment consisting essentially of a dried precipitate resulting from the reaction, in the presence of water, of sublimed litharge and natural magnesite, the said pigment containing from approximately 20 to 70% by weight of lead.

5. A process of making a white pigment which comprises reacting litharge and magnesium carbonate in the presence of water to effect the precipitation of a salt containing lead and magnesium compounds in chemical association with one another, the percentage of litharge employed in said reaction being proportioned to provide a lead content of approximately 20 to 70% in the said precipitate, on a dry basis.

6. A process of making a white pigment which comprises reacting litharge and magnesium carbonate in the presence of a reaction promoting catalyst of the class consisting of acetic and nitric acids, in which reaction lead is present to the extent of approximately 20 to 70% of the combined weight of the litharge and magnesium carbonate.

7. A method of making a white pigment which comprises forming an aqueous slurry of litharge, and introducing magnesium carbonate into the slurry while it is being agitated and thereby causing a precipitate to be formed containing lead and magnesium compounds in chemical association, collecting the said precipitate and drying it, the amount of magnesium carbonate added to said slurry being proportioned to provide a lead content of from approximately 20 to 70% by weight of the said precipitate, on a dry basis.

8. A method of making a white pigment which comprises forming an aqueous slurry of litharge and reacting magnesium carbonate with the litharge in said slurry, in the presence of a reaction promoting catalyst of the class consisting of acetic and nitric acids, while the slurry is being agitated, thereby causing a precipitate to be formed containing lead and magnesium compounds in chemical association, collecting said precipitate and drying it, the amount of magnesium carbonate added to said slurry being proportioned to provide a lead content of from approximately 20 to 70% by weight of the said precipitate, on a dry basis.

9. A paint pigment consisting essentially of a dried precipitate complex resulting from the reaction of litharge and magnesium carbonate in the presence of water, the said complex containing a lead-magnesium complex and magnesium hydroxide and having a lead content of from approximately 20 to 70% by weight, the said pigment being characterized by a bulking value greater than that of basic carbonate white lead, and possessing a hiding power approximating that of basic carbonate white lead when dispersed in a paint vehicle.

10. A method of making a white lead-containing pigment which comprises reacting litharge and a magnesium carbonate compound having substantially the formula

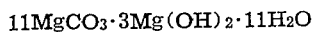

in the presence of water, and a reaction promoting catalyst of the class consisting of acetic and nitric acids, the said reaction being conducted at an elevated temperature in the range from approximately room temperature to a temperature below the boiling point of water, the amount of litharge used in said reaction being sufficient to provide a lead content of from approximately 20 to 70% by weight, on a dry basis, in the produced pigment.

11. A white lead-containing pigment consisting essentially of a dried precipitate resulting from the reaction of litharge and a magnesium carbonate compound in the presence of water, the said dried precipitate containing a lead-magnesium complex, and the said dried precipitate containing lead to the extent of from approximately 20% to 70% by weight, the said precipitate being characterized by a higher bulking value than basic carbonate white lead and by whiteness comparable to the whiteness of basic carbonate white lead.

12. A method of making a white pigment containing lead, which method comprises reacting litharge and a magnesium carbonate compound with one another in the presence of water, and a reaction promoting catalyst of the class consisting of nitric and acetic acids, at an elevated temperature below the boiling point of water and while the components are being agitated, thereby causing a precipitate to be formed containing lead and magnesium compounds, collecting the said precipitate and drying it, the litharge and magnesium carbonate being proportioned to provide a lead content of from approximately 20 to 70% by weight of the dried precipitate.

13. A white pigment consisting essentially of a dried precipitate resulting from the reaction of litharge and a basic magnesium carbonate in the presence of water, the said precipitate containing from approximately 40% to 60% by weight of lead, and being characterized by its high bulking value and having a hiding power approximating that of basic carbonate white lead when the pigment is dispersed in a paint vehicle.

References Cited in the file of this patent

FOREIGN PATENTS

| Number | Country | Date |
|---|---|---|
| 9,638 | Great Britain | of 1912 |

OTHER REFERENCES

"Treatise on Color Manufacture," Zerr and Rubencamp, Griffin & Co., Ltd., London, England, 1908, page 113.

"Manufacture of Colors for Painting," Riffault et al., Baird, publisher; Philadelphia; 1874; page 112.

"Inorganic Chemistry," Partington MacMillan & Co., Ltd., London, England; 1926; page 928.

"Modern Inorganic Chemistry," Mellor, Longmans, Green & Co., New York; revised edition, 1939, pages 621 and 705.